(12) United States Patent
Van Dok et al.

(10) Patent No.: US 9,317,192 B2
(45) Date of Patent: *Apr. 19, 2016

(54) DYNAMIC STACKING AND EXPANSION OF VISUAL ITEMS

(71) Applicant: MICROSOFT CORPORATION, Redmond, WA (US)

(72) Inventors: Cornelis K Van Dok, Bellevue, WA (US); Fabrice A Debry, Bellevue, WA (US); Lyon King-Fook Wong, Issaquah, WA (US); Timothy P McKee, Seattle, WA (US); Andrew S Crane, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 230 days.

This patent is subject to a terminal disclaimer.

(21) Appl. No.: 13/903,642

(22) Filed: May 28, 2013

(65) Prior Publication Data

US 2013/0263030 A1 Oct. 3, 2013

Related U.S. Application Data

(63) Continuation of application No. 11/037,259, filed on Jan. 19, 2005, now Pat. No. 8,464,176.

(51) Int. Cl.
*G06F 3/048* (2013.01)
*G06F 3/0484* (2013.01)
(Continued)

(52) U.S. Cl.
CPC .......... *G06F 3/04842* (2013.01); *G06F 3/0481* (2013.01); *G06F 3/0483* (2013.01)

(58) Field of Classification Search
CPC .. G06F 3/0481; G06F 3/0483; G06F 3/04842
USPC ......... 715/793, 797–800, 835, 732, 853, 862, 715/833
See application file for complete search history.

(56) References Cited

U.S. PATENT DOCUMENTS 5,060,135 A * 10/1991 Levine et al. ................. 715/769
5,499,330 A    3/1996 Lucas et al.
(Continued)

OTHER PUBLICATIONS

Notice of Allowance, mailed Feb. 14, 2013, in U.S. Appl. No. 11/037,259.

(Continued)

*Primary Examiner* — Kieu Vu
*Assistant Examiner* — Asteway T Gattew
(74) *Attorney, Agent, or Firm* — Jim Banowsky; Judy Yee; Micky Minhas

(57) ABSTRACT

Aspects of the present invention are directed to the stacking of visual items, and their subsequent expansion, or unstacking. Upon selection of a stack, that stack expands into the individual visual items making up that stack. Further aspects of the present invention are directed to expanding a stack in different ways depending upon the circumstances. Further aspects of the present invention are directed to providing a hot area associated with, and potentially disposed around, a stack. Selection by the user of the hot area results in selection of the associated stack. The stack may itself be considered a single item that is itself selectable. After the stack is expanded, then the individual visual items making up the original stack are each individually selectable. However, when stacked, the individual items may not be selectable except as a complete stack.

17 Claims, 8 Drawing Sheets

(51) Int. Cl.
*G06F 3/0481* (2013.01)
*G06F 3/0483* (2013.01)

(56) References Cited

U.S. PATENT DOCUMENTS

| | | | |
|---|---|---|---|
| 6,067,086 | A | 5/2000 | Walsh |
| 6,262,732 | B1 | 7/2001 | Coleman et al. |
| 6,459,440 | B1 | 10/2002 | Monnes et al. |
| 6,901,403 | B1 | 5/2005 | Bata et al. |
| 7,119,819 | B1 | 10/2006 | Robertson et al. |
| 7,240,292 | B2 | 7/2007 | Hally et al. |
| 7,299,418 | B2 | 11/2007 | Dieberger |
| 7,353,466 | B2 | 4/2008 | Crane et al. |
| 7,519,906 | B2 | 4/2009 | Balabanovic et al. |
| 2001/0035882 | A1* | 11/2001 | Stoakley et al. ............... 345/779 |
| 2002/0140746 | A1 | 10/2002 | Gargi |
| 2002/0154177 | A1 | 10/2002 | Barksdale et al. |
| 2002/0167546 | A1* | 11/2002 | Kimbell et al. ............... 345/790 |
| 2003/0007017 | A1* | 1/2003 | Laffey et al. .................. 345/862 |
| 2003/0117440 | A1* | 6/2003 | Hellyar et al. ................ 345/767 |
| 2005/0005242 | A1 | 1/2005 | Hoyle |
| 2005/0108439 | A1 | 5/2005 | Need |
| 2005/0268237 | A1* | 12/2005 | Crane et al. .................... 715/732 |
| 2006/0095647 | A1 | 5/2006 | Battaglia et al. |
| 2006/0242122 | A1 | 10/2006 | DeVorchik et al. |
| 2006/0242164 | A1 | 10/2006 | Evans et al. |
| 2007/0070066 | A1 | 3/2007 | Bakhash |
| 2007/0283046 | A1 | 12/2007 | Dietrich et al. |
| 2009/0063694 | A1 | 3/2009 | Foo et al. |
| 2011/0004840 | A1 | 1/2011 | Fienberg et al. |

OTHER PUBLICATIONS

Non Final OA, mailed Jul. 13, 2011, in U.S. Appl. No. 11/037,259.
Final OA, mailed Feb. 2, 2011, in U.S. Appl. No. 11/037,259.
Non Final OA, mailed Sep. 14, 2010, in U.S. Appl. No. 11/037,259.
Final OA, mailed Jan. 6, 2010, in U.S. Appl. No. 11/037,259.
Non Final OA, mailed Jun. 9, 2009, in U.S. Appl. No. 11/037,259.
Advisory Action, mailed Dec. 23, 2008, in U.S. Appl. No. 11/037,259.
Final OA, mailed Sep. 4, 2008, in U.S. Appl. No. 11/037,259.
Non Final OA, mailed Jan. 25, 2008, in U.S. Appl. No. 11/037,259.
Non Final OA, mailed Aug. 9, 2007, in U.S. Appl. No. 11/037,259.

* cited by examiner

DYNAMIC STACKING AND EXPANSION OF VISUAL ITEMS

PRIORITY CLAIM

This application is a continuation of U.S. patent application Ser. No. 11/037,259, filed 19 Jan. 2005, and issued on 11 Jun. 2013 as U.S. Pat. No. 8,464,176, which are hereby incorporated herein by reference in their entirety.

FIELD OF THE INVENTION

Aspects of the present invention are directed generally to presenting a plurality of visual items in a convenient way, and more particularly to handling the stacking and unstacking of such visual items.

BACKGROUND OF THE INVENTION

As memory becomes cheaper, the number of files and other types of data that users keep stored on their computer continues to increase. It is not uncommon for a computer to store hundreds, if not tens of thousands, of files. For example, a user may store documents, music, pictures, instant messages, emails, and history logs. As the quantity of stored information grows, so does the challenge of allowing a user to easily access and sort through the information.

Conventionally, computer interfaces present a user with a number of items by displaying representations of the items (e.g., thumbnails or representative icons) in a grid-like manner. However, such a two-dimensional grid format does not scale well when the number of presented items becomes large. Accordingly, an improved way to present items is needed that scales well for large numbers of items.

SUMMARY OF THE INVENTION

Aspects of the present invention are directed to the stacking of visual items, and their subsequent expansion, or unstacking. A unique way of dynamically creating stacks as the density of items increases, and then to expand these stacks as the user desires to interact with the stacks is provided. Stacking items by overlapping them with one another results in a substantial saving of space while simultaneously allowing the items to be grouped in a logical manner. Upon selection of a stack, that stack expands into the individual visual items making up that stack. In essence, upon selecting a stack, the user is effectively able to "zoom in" to that stack and see what items are in the stack. Once the user is done with the items in that stack, the user may again make a selection to dynamically place the items back into the stack as before. The user may then move on to another stack if desired.

Further aspects of the present invention are directed to expanding a stack in different ways depending upon the circumstances. For example, the top-most visual item may remain in place while the underlying items are distributed around, or to one side of, the top-most item. Alternatively, the top-most visual item may also move as necessary to accommodate the space needed to display the remaining visual items.

Still further aspects of the present invention are directed to providing a hot area associated with, and potentially disposed around, a stack. Selection by the user of the hot area results in selection of the associated stack. The stack may itself be considered a single item that is itself selectable. After the stack is expanded, then the individual visual items making up the original stack are each individually selectable. However, when stacked, the individual items may not be selectable except as a complete stack.

These and other aspects of the invention will be apparent upon consideration of the following detailed description of illustrative embodiments.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

An Illustrative Computing Environment

Figure 1:
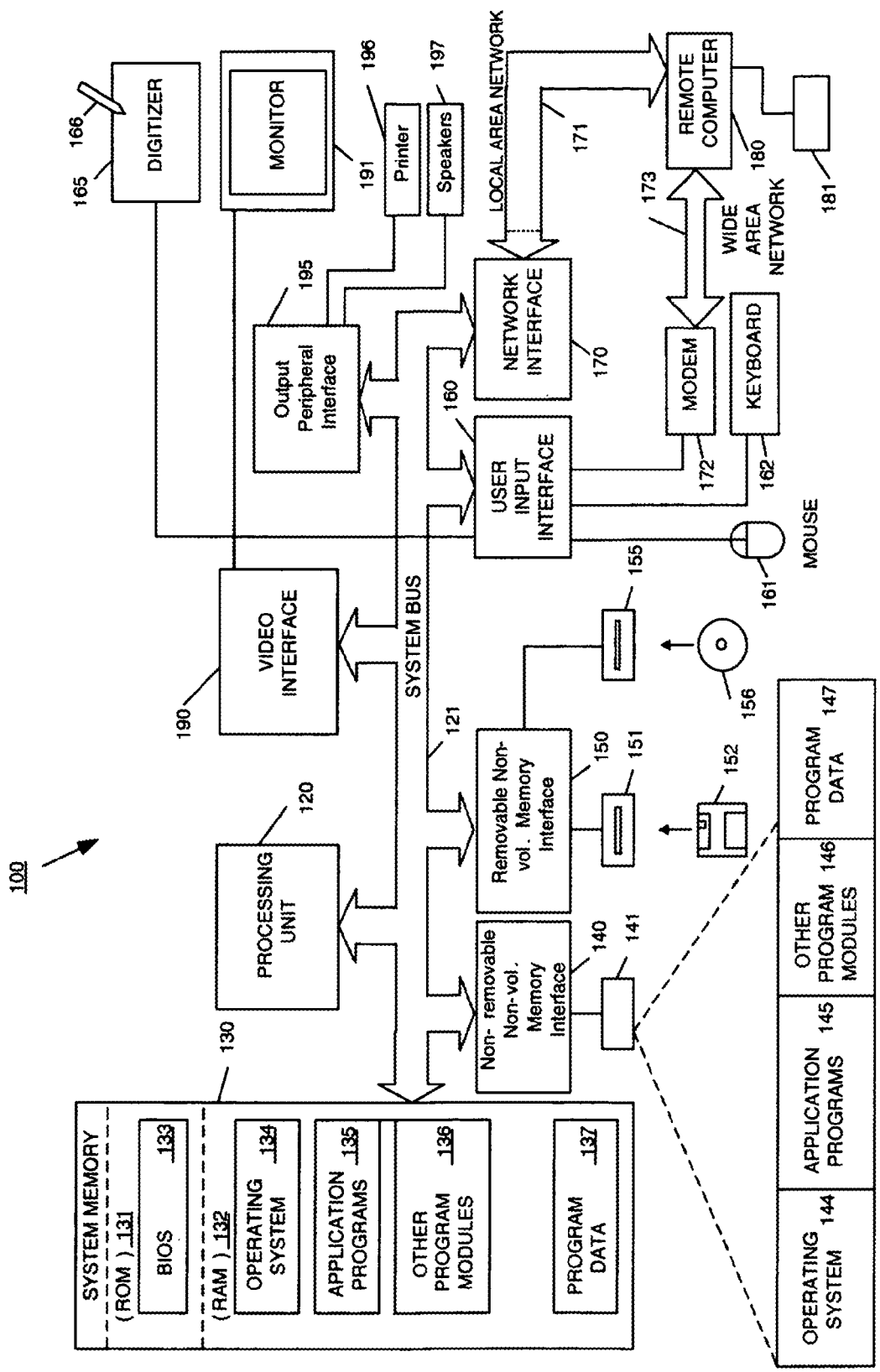
FIG. 1 is a functional block diagram of an illustrative computing environment that may be used with various aspects of the present invention.

Aspects of the present invention may be used in connection with a computing device such as the computer 100 illustratively shown in FIG. 1. Components of the computer 100 may include, but are not limited to, a processing unit 120, a system memory 130, and a system bus 121 that couples various system components including the system memory 130 to the processing unit 120. The system bus 121 may include any of several types of bus structures including a memory bus or memory controller, a peripheral bus, and/or a local bus using any of a variety of bus architectures.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in the ROM 131. The RAM 132 typically contains data and/or program modules that are immediately accessible to and/or presently being operated on by processing unit 120. The computer 100 may also store and/or execute an operating system 134, one or more application programs 135, other program modules 136, and/or program data 137. The computer 100 may further include other removable/non-removable, volatile/nonvolatile computer storage media. By way of example only, FIG. 1 illustrates a hard disk drive 141 that reads from and/or writes to non-removable, nonvolatile magnetic media, a magnetic disk drive 151 that reads from and/or writes to a removable nonvolatile magnetic disk 152, and an optical disk drive 155 that reads from and/or writes to a removable, nonvolatile optical disk 156 such as a CD ROM or other optical media. Other removable/non-removable and volatile/nonvolatile computer storage media that may be used include, e.g., magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150. Data stored on any of the various computer storage media may be stored in a variety of formats. For example, data may be stored as discrete portions such as files or other items. An electronic file system, which may be part of the operating system 134 and/or separate from it, may be responsible for managing the storage, retrieval, and/or searching of items and other data on the computer storage media. The electronic file system may be implemented as software, hardware, and/or firmware.

A user may enter commands and information into the computer 100 through input devices such as a touch-sensitive device (e.g., digitizer) 165, or a keyboard 162 and/or a pointing device 161, commonly referred to as a mouse, trackball, stylus, or touch pad. Other input devices (not shown) may include a microphone, joystick, game pad, satellite dish, scanner, or the like. These and other input devices are often connected to the processing unit 120 through a user input interface 160 that is coupled to the system bus 121, but may be coupled via other interface and bus structures such as a parallel port, a game port, or a universal serial bus (USB). A monitor 191 or other type of display device is also connected to the system bus 121 via an interface such as a video interface 190. The computer 100 may further include other peripheral output devices such as speakers 197 and printer 196, which may be connected to the system bus 121 via an output peripheral interface 195.

A touch-sensitive device 165, which may have an accompanying stylus 166, is provided in order to digitally capture freehand input. Although a direct connection between the touch-sensitive device 165 and the user input interface 160 is shown, in practice, the touch-sensitive device 165 may be coupled to the processing unit 120 directly, via parallel port or another interface, or via the system bus 121 by any technique, either wired or wirelessly. User input to the touch-sensitive device 165 may be in the form of touch input (i.e., where an object such as the stylus 166, a user's finger, or another type of stylus, physically contacts the touch-sensitive surface of the touch-sensitive device 165).

The computer 100 may operate in a networked environment using logical connections to one or more remote computers, such as a remote computer 180. The remote computer 180 may be a personal computer (such as a desktop computer, a laptop computer, or a tablet-style computer), a handheld computer (e.g., a personal digital assistant), a server, a router, a network PC, a peer device, or other common network node, and typically includes many or all of the elements described above relative to the computer 100, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. The computer 100 may further include wired and/or wireless capabilities. For example, the network interface 170 may be BLUETOOTH, SWLan, and/or IEEE 802.11 compatible. It is appreciated that other wireless communication protocols may be used in conjunction with these protocols or in place of these protocols.

When used in a LAN networking environment, the computer 100 is connected to the LAN 171 through a network interface or adapter 170. When used in a WAN networking environment, the computer 100 typically includes a modem 172 or other means for establishing communications over the WAN 173, such as the Internet. The modem 172, which may be internal or external, may be connected to the system bus 121 via the user input interface 160 or other appropriate mechanism.

Illustrative Graphical User Interface

Figure 2:
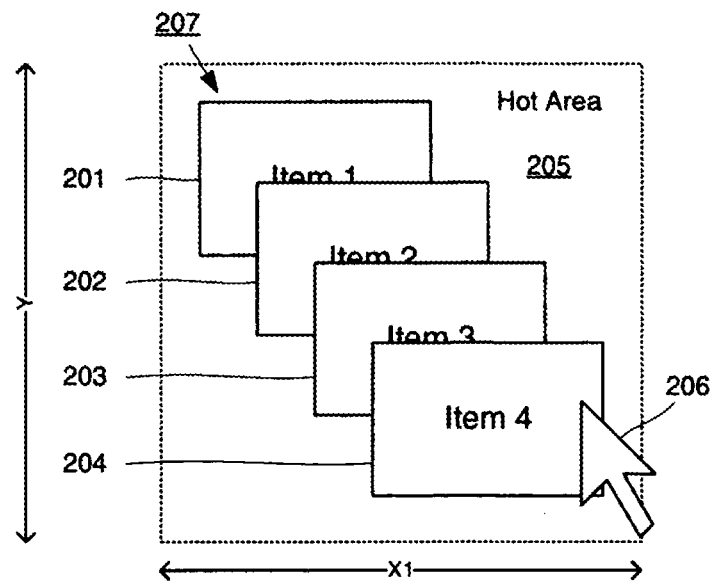
FIG. 2 is a screenshot of an illustrative stack of visual items having an illustrative rectangular hot area.

Referring to FIG. 2, a graphical user interface, which is displayed by the display device of the computer 100, includes an illustrative plurality of visual items 201, 202, 203, 204 arranged as a stack 207. As shown, the illustrative stack 207 thus has four visual items, although a stack may have any number of plural visual items. As used herein, the term "visual item" is intended to refer to elements that are displayed to the user on a graphical user interface. Visual items include icons or any other summary representations of, e.g., files, contacts, folders, objects, emails, or event notifications (discussed further below). Visual items may be in the form of, e.g., icons, thumbnails of the contents of the items, and/or textual descriptors.

Visual item 204 (Item 4) is at the top of the stack 207 (also referred to as a top-level visual item) and is fully visible such that the entire visual item 204 can be seen by the user. The remaining items 201-203 are only partially visible as they are in partial overlapping relationship with each other and with the top visual item 204. The stack 207 itself may be considered a single item and may be dragged and/or selected by the user as a single item. For example, the stack 207 may be represented as a single selectable icon with a visual indication that the stack 207 contains more than one visual item, such as an indication of the actual number of visual items in the stack 207. The stack 207 may also be associated with a user-selectable "hot area" 205. The hot area 205 may be invisible or visible to the user. Where visible, the hot area 205 may be displayed to the user in any manner desired, such as by an outline of the outer limits of the hot area 205, or by a shaded area. A user selection made within the hot area 205 is considered by the computer 100 to be a selection of the stack 207. Thus, to select the stack 207, the user may select either the stack 207 itself or the hot area 205.

While the hot area 207 is shown in FIG. 2 as a rectangular area having dimensions of X1 by Y, it may be of any shape and/or size. The shape and/or size of a hot area may depend upon the shape of the stack 207 and/or the number of visual items in the stack 207. For example, referring to FIG. 3, a hot area 305 may alternatively be provided that conforms to the outer shape of the stack 207.

Selections of various elements of the graphical user interface may be made using the pointing device 161 (such as a mouse or a stylus) or with another type of input device such as a keyboard. In the shown embodiment, a cursor 206 is controllable by the user for selection purposes. Once the user has moved the cursor 206 to be directed at an item (e.g., by placing the cursor 206 over the item), then the user may instruct the computer 100 to select that item by pressing a button (such as on a mouse), by tapping on the item or making a gesture on the item (such as by using a stylus on a touch-sensitive display), by pressing 'a button, or by way of some other user input. Although the cursor 206 is shown, the use of a displayed cursor is not necessary to implement the present invention. For example, a user may directly tap on a visual item with a stylus on a touch-sensitive display, without the need for a displayed cursor.

Figure 3:
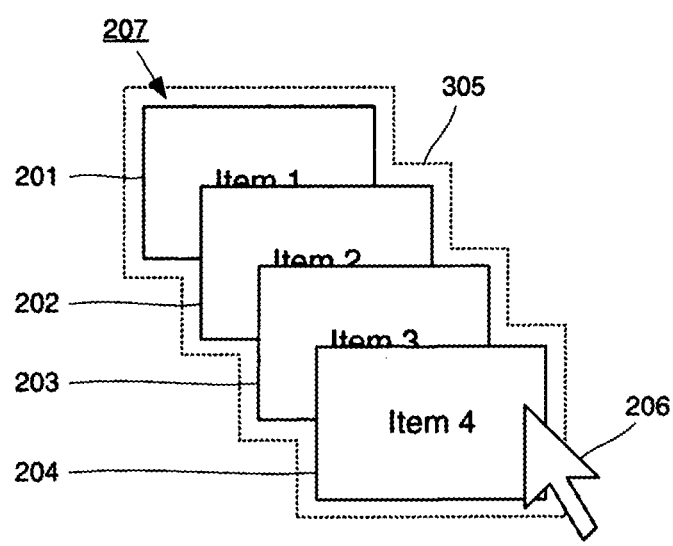
FIG. 3 is a screenshot of the stack of visual items of FIG. 2 having an illustrative outline-shaped hot area.
Figure 4:
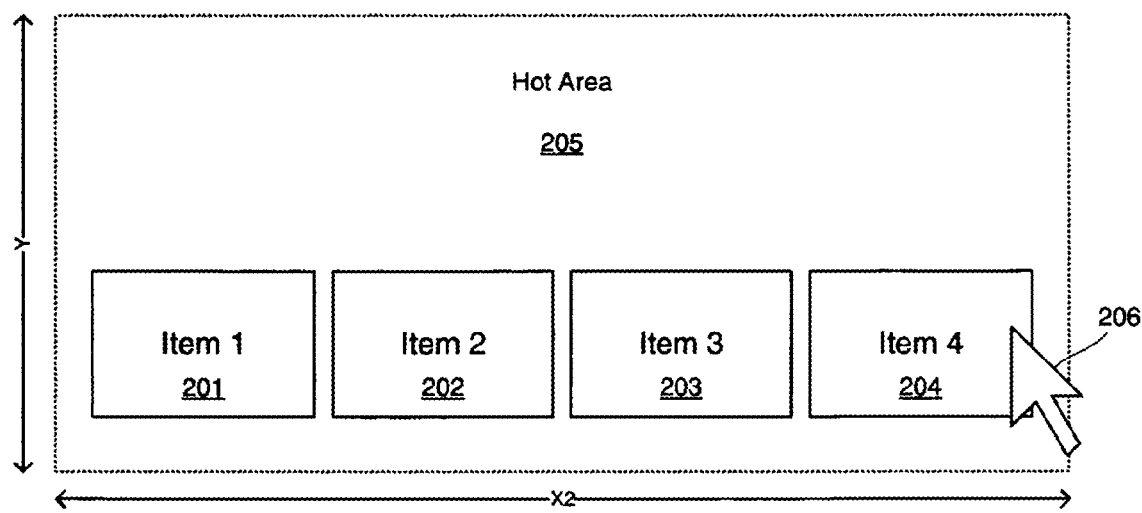
FIG. 4 is a screenshot of an illustrative expansion of the stack of visual items of FIG. 2.

Referring to FIG. 4, in response to user selection of the stack 207 in either FIG. 2 or 3 (by selecting either the stack itself 207 or the hot area 205 or 305), the stack 205 may expand such that the visual items 201-204 in the stack are displayed side-by-side with respect to one another. Thus, FIGS. 2 and 3 show the graphical user interface before user selection of the stack 207, and FIG. 4 shows the same graphical user interface after user selection of the stack 207. When part of the stack 205, the visual items 201-204 take up less room on the display device. However, in this expanded configuration, each of the visual items 201-204 are no longer in a stack and take up more room on the display device, but are now fully visible to the user. Thus, the user may more easily evaluate each visual item 201-204 and determine what actions the user may take with one or more of the visual items 201-204. For instance, the user may now more easily see that visual item 201 is an icon representing a particular word processing file and that visual item 202 is an icon representing a particular spreadsheet file.

In this example, the visual items 201-204 are evenly distributed along a single axis from left to right across the display device of the computer 100. However, visual items that have been expanded from a stack may be distributed in a side-by-side configuration in any direction, such as left-right, up-down, diagonally, or in multiple simultaneous directions (such as in a grid pattern). Visual items from an expanded stack may be distributed evenly or unevenly around the display.

As shown in FIG. 4, in addition to expanding the stack 207, the hot area 205 may change shape and/or size in response to user selection of the stack 205. Because the stack 207 no longer exists in this expanded configuration, the hot area 205 is now associated with the plurality of visual items 201-204 themselves. The hot area 205 may change shape and/or size to accommodate, and encompass, all of the visual items 201-204 that were previously part of the stack• 207 and that are now distributed in a non-stacked manner. For example, as shown, the hot area 205 may grow larger to accommodate the increased display area required by the visual items 201-204 in their expanded state as compared with the display area required by the relatively compact stack 207. As shown, the hot area 205 of FIG. 4 has the same height Y as the hot area 205 in FIG. 2, but has a width X2 greater than the original width X1. Of course, the X and Y directions may be reversed such that the hot area 205 grows in the Y direction but not the X direction. Alternatively, the hot area 205 may shrink or grow in both the X and Y directions. For example, the hot area 205 may grow in the X direction as shown but shrink in the Y direction while still encompassing all of the visual items 201-204.

It should also be noted that in this example, the cursor 206 and visual item 204 have remained in their same respective locations on the display device in all of FIGS. 2, 3, and 4. Therefore, in this example, upon selection of the stack 207, visual items 201-203 effectively move and spread out from their original positions toward the left of visual item 204, while visual item 204 remains in its original position. Alternatively, visual item 204 may move from its original position if desired. The latter situation will be discussed further below.

Figure 5:
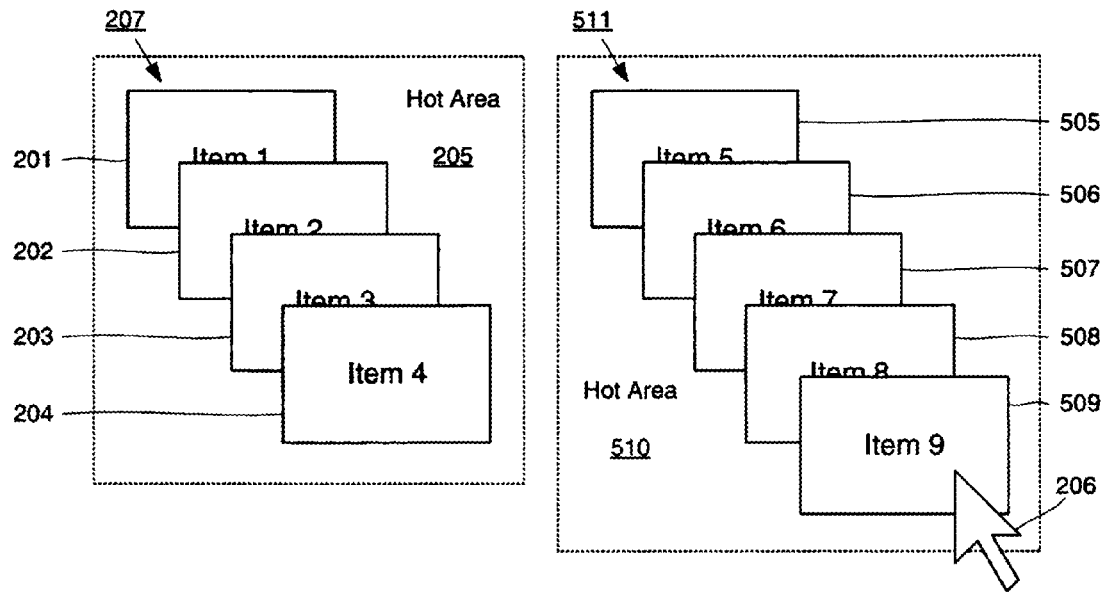
FIGS. 5 and 7 are each a screenshot of two illustrative side-by-side stacks of visual items.
Figure 6:
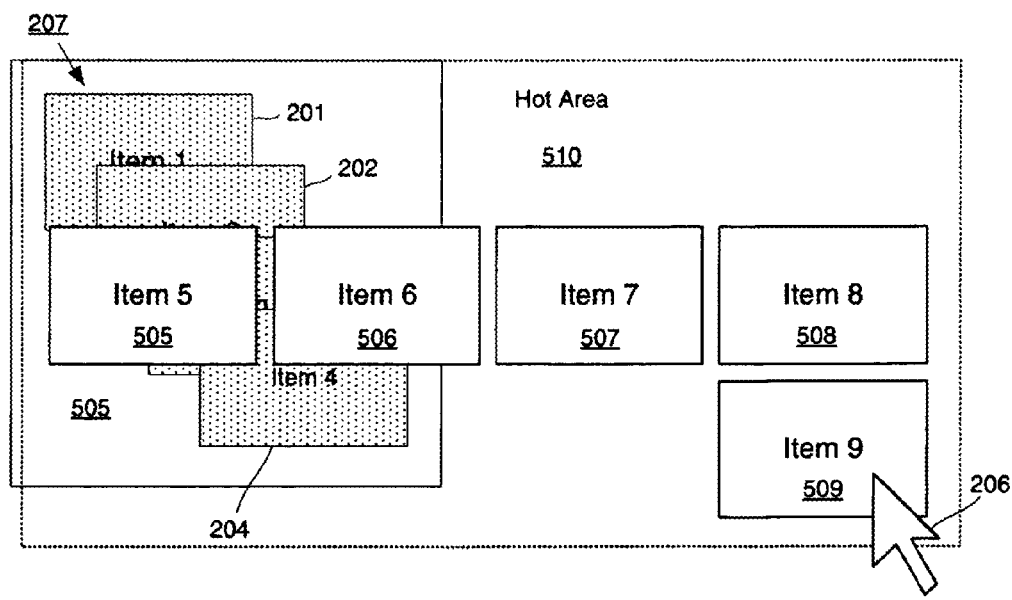
FIG. 6 is a screen shot showing one of the stacks of FIGS. 5 and 7 being expanded into an illustrative non-stacked format.

An illustrative situation will now be discussed where two stacks are simultaneously shown in close proximity on the graphical user interface. Referring to FIG. 5, in addition to the stack 207, a second stack 511 is shown having five visual items 505-509. Each stack has its own respective hot area 205, 510. In this example, the user selects stack 511, and the result of such a selection is shown in FIG. 6. The expansion of stack 511 results in a distribution of the contents of that stack (i.e., visual items 505-509) across the display, except that in this example visual items 505-509 are expanded in two dimension in a grid-like fashion. The expanded visual items 505-509 may be provided in a layer that is above a layer that the non-selected stack 207 is in. Accordingly, one or more of the visual items 505-509 in their expanded state may overlap and hide some or all of the non-selected stack 207. In addition, hot area 510 may expand as previously discussed to continue to encompass all of the visual items 505-509 and may also overlap and hide some or all of the hot area 205 of the non-selected stack 207. Again, in this example, item 509 and the cursor 206 remain in their same respective positions between FIGS. 5 and 6.

Figure 7:
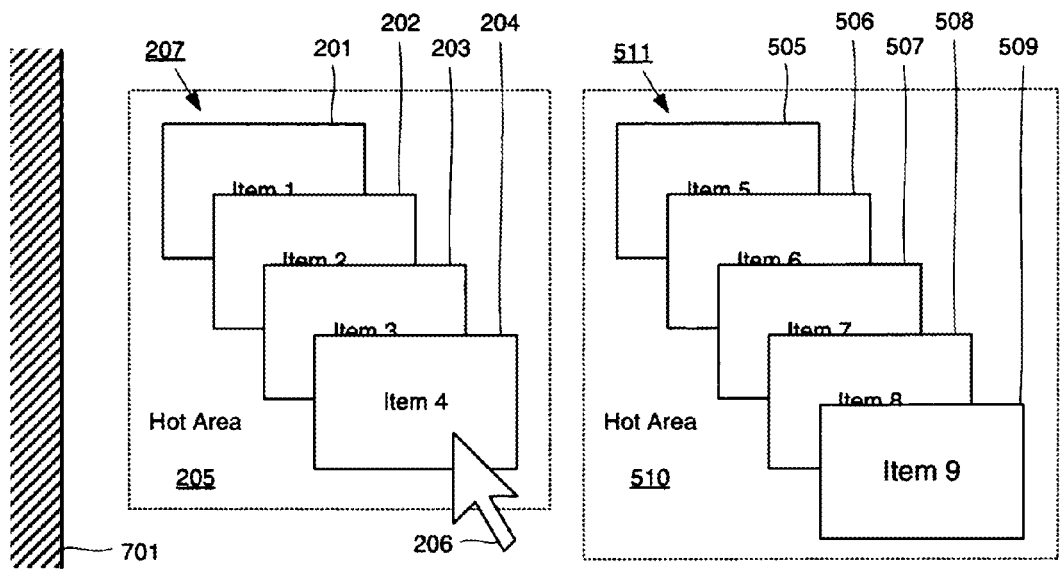

Referring to FIG. 7, the same set of stacks 207, 511 is shown, but this time the cursor 206 is over the hot area 205 instead of the hot area 510, and thus the user is about to select the stack 207 instead of the stack 511. In addition, a control boundary 701 is shown near and to the left of the stack 207. A control boundary as referred to herein is any boundary beyond which visual items from an expanded stack will not cross. A control boundary may be a physical display boundary, or may be user-defined or software-defined. For example, each of the displayable edges of the display device may be considered a control boundary. Or, for instance, each of the edges of a displayed window may be a control boundary. For example, where the two stacks 207, 511 are displayed within the same window, the edges of that window may each be a control boundary beyond which the expanded visual items within the stacks 207, 511 may not be distributed.

Figure 8:
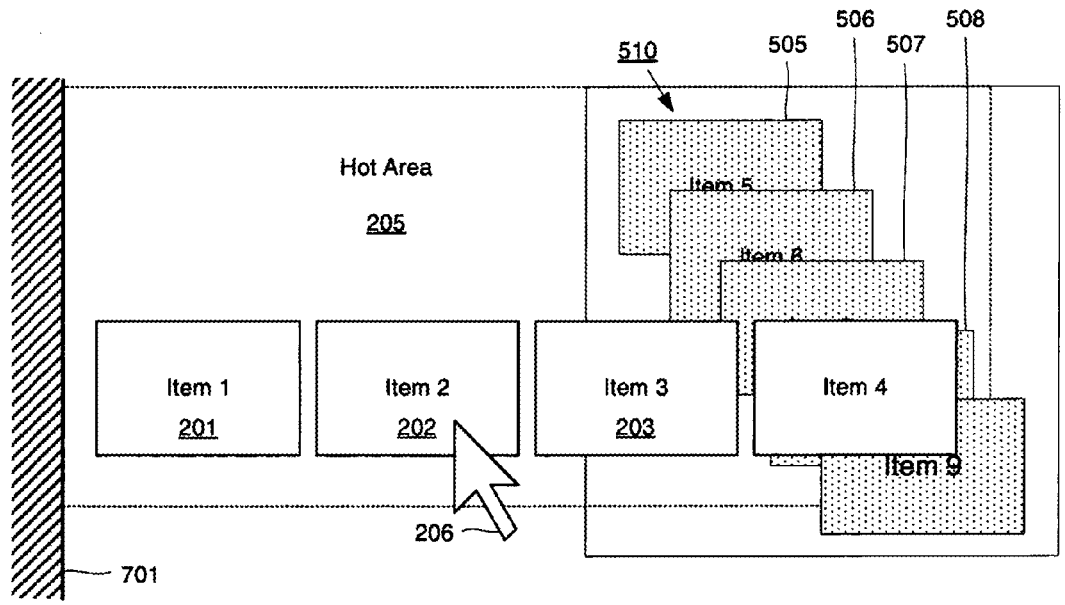
FIG. 8 is a screen shot showing the other of the stacks of FIGS. 5 and 7 being expanded into an illustrative non-stacked format.

Thus, in this example, it will be assumed that when either stack 207 or 511 is expanded, their respective visual items will be distributed in such a way so as to not extend beyond the control boundary 701. In this case, if the stack 205 were expanded such that visual items 201-203 were distributed side-by-side to the left of visual item 204, then they would not fit in a single row. Accordingly, the computer 100 may determine this and decide that the visual items 201-204 should be distributed in a different way. For example, as shown, items 201-204 may be distributed from left to right, but in order to allow all four of these visual items to remain to the right of the control boundary 701, visual item 204 may move toward the right. This is shown in FIG. 8 to the extent that the cursor 206 remains in the same location yet is now shown over visual item 202. In this example, had the control boundary 701 not existed or been sufficiently far away from the stack 205, then visual item 204 may not have needed to be moved and only visual items 201-203 would have been moved toward the left of visual item 204.

Figure 9:
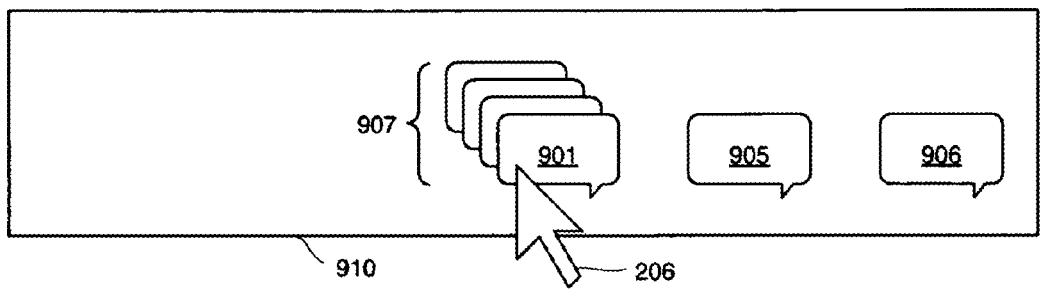
FIG. 9 is a screen shot of an illustrative plurality of notifications including a stack of notifications.

Referring now to FIG. 9, a plurality of visual items in the form of event notifications are shown. An illustrative presentation of event notifications, also referred to as message notification objects, is discussed in U.S. patent application Ser. No. 10/855,630, entitled "System and Method for Generating Message Notification Objects on Dynamically Scaled Timeline," filed May 28, 2004, and incorporated by reference herein as to its entirety. In the example of FIG. 9, an illustrative event notification window 910 or other defined region has within it a stack 907 of event notifications including a top-level event notification 901, along with individual unstacked event notifications 905 and 906. The event notifications may be distributed along the event notification window 910 in accordance with a timeline, wherein older event notifications are presented toward the left side of the event notification window 910 and more recent event notifications are presented toward the right side of the event notification window 910. As the number of displayed event notifications increases, earlier older notifications may be automatically stacked to make room for newer event notifications. Similarly, in this example, the top-level event notification of stack 907 is the most recent event notification in that stack 907, wherein the earlier the event notification, the further back in the stack 907 the event notification is located. Alternatively or additionally, event notifications may be stacked together in accordance with their content.

Figure 10:
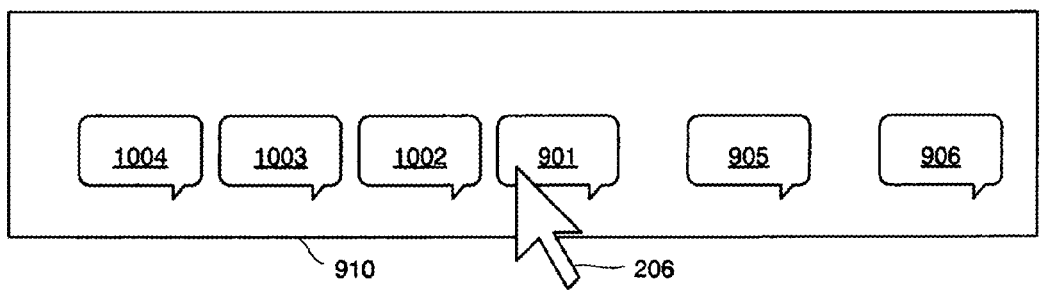
FIG. 10 is a screen shot showing the stack of notifications of FIG. 9 being illustratively expanded.

In the present example, the user selects the stack 907, and the result of the user selection is shown in FIG. 10. Here, the stack 907 is expanded such that all of the event notifications therein (i.e., event notifications 901, 1002, 1003, and 1004) are fully visible and distributed side-by-side. The boundaries of the event notification window may each be considered a control boundary. Because there is sufficient room to the left of top-level event notification 901, the remaining event notifications of stack 907 may be fully distributed to the left of event notification 901 without the need to move event notification 901.

Figure 11:
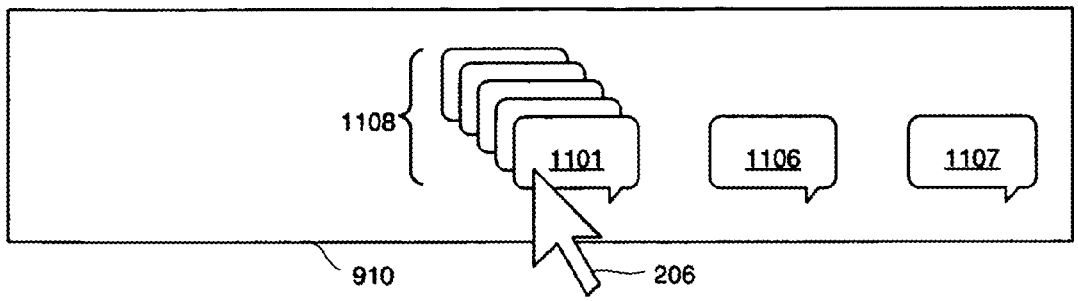
FIG. 11 is a screen shot of another illustrative plurality of notifications including a stack of notifications.
Figure 12:
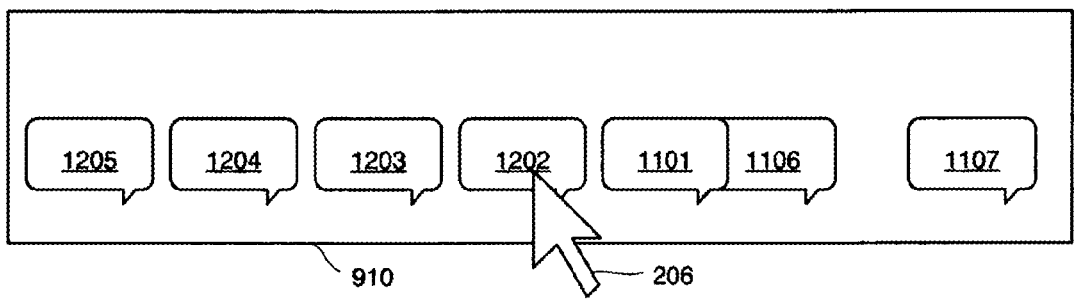
FIG. 12 is a screen shot showing the stack of notifications of FIG. 11 being illustratively expanded.

However, the situation is different in FIGS. 11 and 12. In those figures, the event notification window now has a stack 1108 including top-level event notification 1101, along with individual event notifications 1106 and 1107. In response to a user selection of the stack 1108, all of the event notifications in the stack 1108 (i.e., event notifications 1101, 1202, 1203, 1204, and 1205) are expanded. However, in this case, if top level event notification 1101 were to remain in place, then there would not be sufficient room within the event notification window 910 to fully distribute all of the event notifications in the stack 1108 to the left of event notification 1101. Accordingly, the computer 100 determines this and decides to move event notification 1101 toward the right so as to make sufficient room to fully distribute all of the event notifications in the stack 1108 to the left of event notification 1101. Alternatively or additionally, computer 100 may determine that event notification 1106 and/or 1107 should be moved to minimize or even eliminate overlap with other event notifications or other types of visual items. For example, event notifications 1106 and 1107 may be moved toward the right to make room for event notification 1101. Where event notification 1107 is moved far enough to the right such that it begins to move off the display, event notification 1107 may be only partially visible. This may be acceptable, however, since at this moment the user is focusing on the expansion of stack 1108. Once the user has deselected stack 1108 such that it is again reduced to a stack format, then event notifications 1106 and 1107 may again move to their original positions and therefore again be fully visible to the user. In still further embodiments, stack 1108 may expand such that the visual item in stack 1108 closest to cursor 206 remains in place while the remaining visual items in stack 1108 are distributed away from that visual item.

Figure 13:
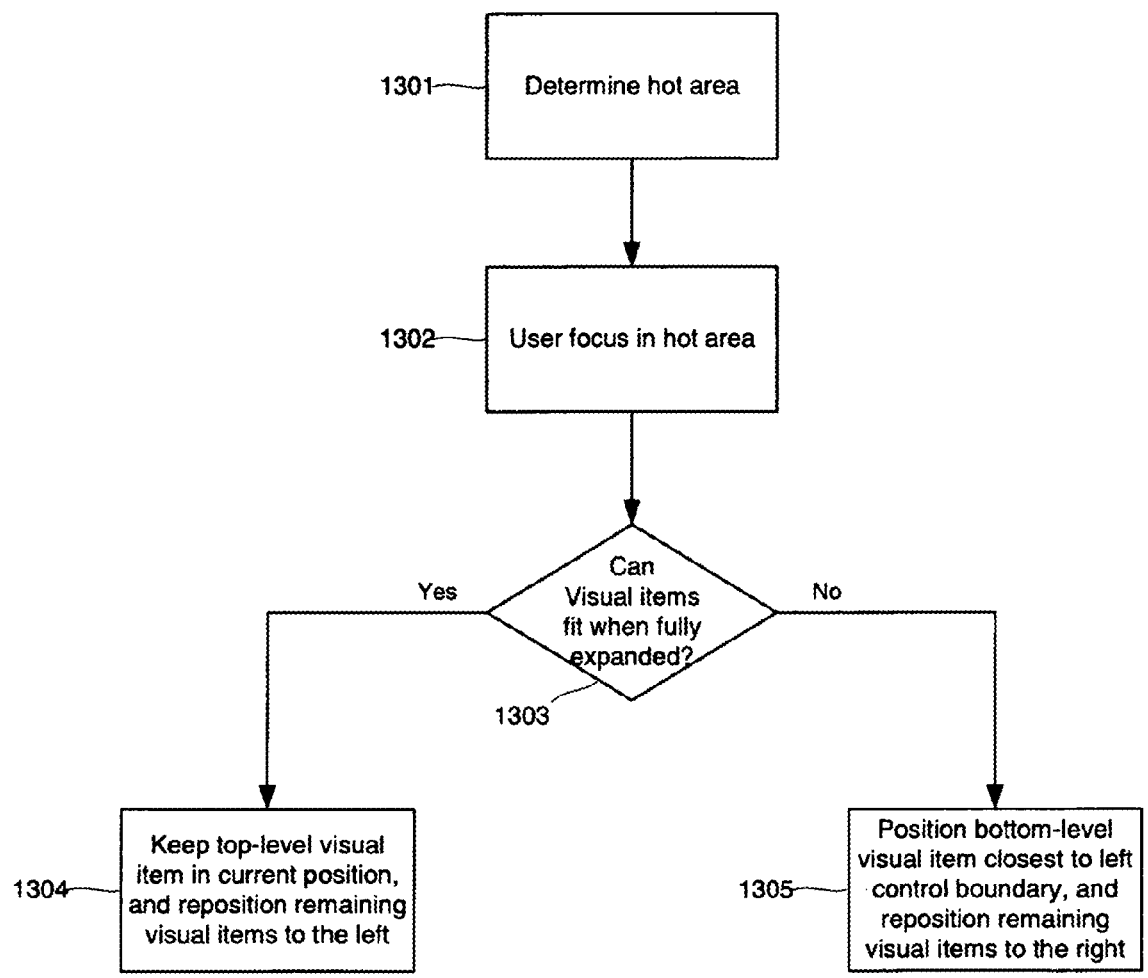
FIG. 13 is a flowchart showing illustrative steps that may be taken for determining how visual items should be presented to a user.

In summary, an illustrative process for expanding a stack into a plurality of distributed visual items can be described in connection with FIG. 13. In step 1301, the computer 100 determines the appropriate hot area associated with a stack of visual items. In step 1302, the user focuses on, or selects, the hot area (or the stack itself), which indicates a user's desire to select the stack. In response, the computer determines in step 1303 whether all of the items of the selected stack can be fully distributed without overlap and without moving the top-level visual item of the selected stack. If so, then that is what the computer 100 does in step 1304. If not, then the computer 100 moves the top-level visual item as needed. For example, in step 1305, the computer 100 positions the bottom-level visual item (i.e., the visual item at the bottom of the selected stack) closest to the left control boundary, and distributes the remaining visual items of the selected stack to the right of the bottom-level visual element.

CONCLUSION

Thus, an improved way to present items is needed that scales well for large numbers of items has been presented. It should be noted that references to certain directions (e.g., left-right, up-down) are merely illustrative, and the invention is not limited to the examples presented herein. Also, no claim element should be interpreted under 35 U.S.C. 112, paragraph six, unless that claim element includes the phrase "means for," "step for," or "steps for."

What is claimed is:

1. A computer-readable hardware device storing computer executable instructions for performing a method for presenting visual items on a graphical user interface of a computer, the method comprising:
    providing a plurality of visual items as an expandable icon;
    receiving a first user selection of a first region associated with the expandable icon;
    responsive to the first user selection, determining whether sufficient room exists for all of the plurality of visual items side-by-side without moving the top one of the visual item:
        (1) if it is determined responsive to determining that sufficient room does exist, repositioning the plurality of visual items side-by-side and altering the size or shape of the first region, and
        (2) if it is determined responsive to determining that sufficient room does not exist, repositioning a bottom-most one of the visual items in the expandable icon at a left-most area, at least some of the remaining ones of the plurality of visual items side-by-side and to the right of the bottom-most one of the visual items, and other visual items above or below the visual items side-by-side;
    receiving a second user selection of a second region while the plurality of visual items are side-by-side, wherein the second region encompasses a same of the plurality of visual items that are encompassed within the first region;
    responsive to the second user selection, again returning the plurality of visual items to an overlapping position associated with a top-level visual item.

2. The computer-readable hardware device of claim 1, further including, responsive to determining that sufficient room does not exist, moving a top-level visual item to make sufficient room for all of the plurality of visual items.

3. A computer system having processors and memories configured to execute a method for providing visual items on a graphical user interface of a computer, the method comprising:
    providing, by a computer processor, a plurality of visual items as an expandable icon having an associated first region that surrounds the plurality of visual items;
    associating, by the computer processor, the plurality of visual items with a count that indicates a number of visual items in the expandable icon;

repositioning, by the computer processor, the plurality of visual items associated with the expandable icon in response to a gesture such that once repositioned, the plurality of visual items are surrounded by a second region having a size or shape that is different than the first region;

receiving a first user selection of the expandable icon and responsive to the first user selection, determining whether sufficient room exists for all of the plurality of visual items side-by-side without moving the top one of the visual item; and responsive to determining that sufficient room does exist, repositioning the plurality of visual items side-by-side and altering the size or shape of the first region.

4. The system of claim 3, further including, responsive to determining that sufficient room does not exist, moving a top-level visual item to make sufficient room for all of the plurality of visual items.

5. The system of claim 3, further including, displaying at least one visual item corresponding to the expandable icon.

6. The system of claim 3, further including, displaying a hot area that causes the expandable icon to reposition the plurality of visual items in a non-overlapping orientation.

7. The system of claim 3, wherein the first region indicates that the expandable icon is associated with the plurality of visual items.

8. A computer-implemented method for providing visual items on a graphical user interface of a computer, the method comprising:

providing, by a computer processor, a plurality of visual items as an expandable icon having an associated first region that surrounds the plurality of visual items;

associating, by the computer processor, the plurality of visual items with a count that indicates a number of visual items in the expandable icon;

repositioning, by the computer processor, the plurality of visual items associated with the expandable icon in response to a gesture such that once repositioned, the plurality of visual items are surrounded by a second region having a size or shape that is different than the first region;

receiving a first user selection of the expandable icon and responsive to the first user selection, determining whether sufficient room exists for all of the plurality of visual items side-by-side without moving the top one of the visual item; and responsive to determining that sufficient room does exist, repositioning the plurality of visual items side-by-side and altering the size or shape of the first region.

9. The method of claim 8, further including, responsive to determining that sufficient room does not exist, moving a top-level visual item to make sufficient room for all of the plurality of visual items.

10. The method of claim 8, further including, displaying at least one visual item corresponding to the expandable icon.

11. The method of claim 8, further including, displaying a hot area that causes the expandable icon to reposition the plurality of visual items in a non-overlapping orientation.

12. The method of claim 8, wherein the first region indicates that the expandable icon is associated with the plurality of visual items.

13. The method of claim 8, further comprising responsive to determining that sufficient room does not exist, repositioning a bottom-most one of the visual items in the stack at a left-most area, at least some of the remaining ones of the plurality of visual items side-by-side and to the right of the bottom-most one of the visual items, and other visual items above or below the visual items side-by-side.

14. The medium of claim 8, further including, responsive to determining that sufficient room does not exist, moving a top-level visual item to make sufficient room for all of the plurality of visual items.

15. The method of claim 8, further comprising receiving a second user selection of a second region having the altered size or shape of the first region and surrounding the plurality of visual items while the plurality of visual items are side-by-side.

16. The method of claim 15, further comprising responsive to the second user selection, again returning the plurality of visual items to an overlapping position associated with a top-level visual item.

17. The method of claim 8, wherein selection of the expandable icon selects all of the visual items associated with the expandable icon.

* * * * *